United States Patent [19]

Abdallah et al.

[11] 4,445,804
[45] May 1, 1984

[54] METHOD AND APPARATUS FOR REMOTE RECOVERY OF SUBMERGED PIPELINES

[75] Inventors: Mohamed G. Abdallah; William M. McDonald, both of Houston, Tex.

[73] Assignee: Exxon Production Research Co., Houston, Tex.

[21] Appl. No.: 382,894

[22] Filed: May 28, 1982

[51] Int. Cl.³ .............................................. F16L 1/04
[52] U.S. Cl. ...................................... 405/173; 405/169
[58] Field of Search ............... 405/156, 158, 169, 170, 405/173, 191; 166/343

[56] References Cited

U.S. PATENT DOCUMENTS

| | | | |
|---|---|---|---|
| 3,592,014 | 7/1971 | Brown et al. | 166/343 X |
| 4,004,635 | 1/1977 | Marquaire et al. | 405/169 X |
| 4,133,182 | 1/1979 | Chateau | 405/169 |
| 4,234,268 | 11/1980 | Scodino | 405/158 |
| 4,278,362 | 7/1981 | Scherrer | 405/191 |

Primary Examiner—David H. Corbin
Attorney, Agent, or Firm—Alan J. Atkinson

[57] ABSTRACT

A method and apparatus for the remote recovery of submerged pipelines is disclosed. The operations are entirely controlled by an operator located on a lay barge or other floating vessel. A buoy and cables are manipulated from the lay barge to deploy equipment to a submerged pipeline. To utilize the invention, an alignment cable is threaded through a pipe alignment frame and is then connected to a buoy. The pipe alignment frame is lowered by the alignment cable into an operational relationship with the submerged pipeline. Once the pipe alignment frame is in an operational relationship with the submerged pipeline, the alignment cable is slackened and the buoy and attached alignment cable rise to the water surface. Cutting equipment connected to a retrieval cable is connected to the alignment cable. The cutting equipment is lowered to a predetermined location relative to the pipe alignment frame and attached pipeline by taking in the alignment cable while paying out the retrieval cable. The cutting equipment is activated to sever the pipeline. Once the pipeline has been severed, the cutting equipment is raised to the lay barge by taking in the retrieval cable while paying out the alignment cable. To recover the pipeline, a pipeline lift head connected to a retrieval cable is connected to the alignment cable. The alignment cable is taken in while the retrieval cable is paid out to lower the lift head in the water until the lift head is inserted into the severed pipeline end. A stabbing guide attached to the lift head facilitates the insertion of the lift head into the pipeline. The lift head is remotely actuated to grip the pipeline and the retrieval cable is taken in to recover the pipeline to the water surface.

24 Claims, 16 Drawing Figures

METHOD AND APPARATUS FOR REMOTE RECOVERY OF SUBMERGED PIPELINES

FIELD OF THE INVENTION

The present invention relates to the remote deployment of equipment into an operational relationship with a submerged pipeline. More particularly, the invention relates to a method and an apparatus to remotely sever a submerged pipeline and to grip the pipeline for retrieval to the water surface.

BACKGROUND OF THE INVENTION

Oil and gas produced from offshore wells is commonly transported by submerged pipelines to onshore consuming markets. These pipelines are typically laid on the sea floor from floating vessels called lay barges. To construct a submerged pipeline, sections of pipe are welded together into a pipeline on the lay barge. As the lay barge is moved forward in the water, the pipeline is continuously lowered to the sea floor over a "stinger" attached to the lay barge. The stinger is an extended support which limits the bending of the pipeline between the lay barge and the sea floor and thus reduces the possibility of pipeline buckling as the pipeline is laid. The pipeline, as it is laid, is held in tension by special gripping devices on the lay barge which are called pipeline tensioners. These tensioners reduce the bending of the pipeline as it is laid and further reduce the possibility of pipeline buckling. This procedure for tensioned pipeline construction is well-known in the art and is thoroughly described in U.S. Pat. No. 3,331,212.

A pipeline can be damaged while the pipeline is being constructed or after the pipeline has been laid. During its construction, the accidental loss of tension in the pipeline due to adverse weather or to the failure of the tensioners can cause the pipeline to bend excessively. This bending can be so extreme as to buckle or otherwise damage the pipeline. A buckled pipeline may be sufficiently weakened to completely break at the point of the buckle. In such an event, the broken pipeline end which is unsupported by the lay barge will fall to the sea floor. After a pipeline has been laid, the pipeline may be damaged by dragging ship anchors or by fishing operations. To repair a broken pipeline end which lies on the sea floor, the pipeline end is usually raised to the water surface so that construction operations can be resumed. To repair a submerged pipeline which has been damaged, the pipeline must be severed so that each end can be independently raised to the water surface. In either situation, where a broken pipeline end lies on the sea floor or where a submerged pipeline has been damaged, a need exists for techniques to raise a pipeline to the water surface so that the pipeline can be repaired.

Various techniques have been used to raise a submerged pipeline end to the water surface. For example, for a submerged pipeline which has been damaged, a conventional recovery technique uses divers to cut the pipeline at the sea floor. The divers then weld a retrieval line to each severed end of the pipeline to raise each pipeline end to the water surface. Alternatively, the divers can connect a lift head to each pipeline end to raise the pipeline end to the water surface. Lift heads are well-known in the art as a means for gripping a pipeline end. For example, a pin-type lift head can be used to connect a retrieval cable to a bar inserted through holes cut in the pipeline. The retrieval cable is then taken in by a winch on the lay barge to raise the pipeline end to the water surface. Another type of lift head is inserted into the open end of a submerged pipeline. This type of lift head grips the pipeline end with hydraulically actuated slips which expand and circumferentially grip the inside of the pipeline. After this type of lift head has been actuated to grip the pipeline, a retrieval cable connected to the lift head raises the pipeline end to the water surface.

As a pipeline end is raised to the water surface, the portion of pipeline raised above the sea floor will bend, by its own weight, in the shape of a catenary between the sea floor and the water surface. 8ecause a heavier pipeline, due to its own weight, will bend more than a lighter pipeline as it is raised, a heavier pipeline is more likely to buckle than is a lighter pipeline. To reduce the pipeline's weight and thus avoid pipeline buckling, a fluid-displacing pipeline pig is frequently used to void the water or other fluid from the portion of pipeline being raised above the sea floor. Pigs are typically propelled through a pipeline by injecting a pressurized gas behind the pig. A pig may be pumped from either end of the pipeline. For example, in a pipeline having an end on the shore while the other end is submerged beneath a body of water, a pig may be pumped through the pipeline from the shore to displace the pipeline fluids through the submerged pipeline end. At greater distances from the shore, the pipeline can be pigged from the submerged pipeline end so that the entire length of pipeline need not be voided. Divers attach a pig to the submerged pipeline end. A fluid-sealing plug is also attached to the submerged pipeline end to prevent the intrusion of sea water into the pipeline. The pig is then pumped from the submerged pipeline end toward the shore to a distance necessary to void only the portion of the pipeline being raised above the sea floor. This pigging procedure can be repeated for the other, submerged segment of the severed pipeline to void it of fluids before its retrieval to the water surface.

While conventional pipeline recovery operations using divers are effective in shallow water, their use is limited at greater ocean depths. Efficient diving operations are restricted to maximum depths of about 180–200 meters, but many pipelines have been laid at much greater depths. To perform pipeline repairs at depths beyond 200 meters, procedures and equipment are required to perform diverless pipeline repairs.

Various methods have been developed to recover damaged pipeline ends without using divers. For a submerged pipeline which has been damaged, a submersible vehicle can manipulate cutting equipment to sever the pipeline. The submersible vehicle then inserts a lift head into the open end of the pipeline which will be raised to the water surface. A retrieval cable attached to the lift head is taken in by a winch on a lay barge to raise the pipeline end. This procedure can be repeated to raise the other submerged end of the pipeline to the lay barge. At the water surface, a pipeline section is welded between both raised pipeline ends to repair the pipeline. The repaired pipeline is then lowered to the sea floor.

Another method for diverless repair of submerged pipelines utilizes a repair frame to grip the submerged pipeline. Cutting equipment to sever the pipeline is often attached to the repair frame. A lift head to grip the pipeline is also attached to the repair frame as is disclosed in U.S. Pat. No. 4,155,669. In water up to 200 meters in depth, divers can operate the repair frame from a control panel located on the repair frame. At depths beyond the reach of divers, a submersible vehicle can operate the repair frame from the control panel.

While submersible vehicles can be used to manipulate equipment and to operate repair frames at depths beyond the reach of divers, there are certain disadvantages attributable to such use. For example, submersible vehicles are expensive to manufacture, to operate and to repair. They require extensive manipulative arms which contribute to the cost of the vehicle, but which are unable to perform certain operations. Furthermore, strong ocean currents, which may range in velocity up to five knots, also limit the use of submersible vehicles because the vehicles are typically unable to negotiate the drag forces induced by such currents.

Each technique used in the recovery of submerged pipeline is therefore constrained by certain limitations. The use of divers for the recovery of submerged pipelines is limited because divers cannot be used at depths greater than 200 meters. While submersible vehicles can be used at depths beyond the reach of divers, submersible vehicles are expensive and cannot operate under certain conditions. A need, therefore, exists for a method and apparatus to remotely deploy equipment to a damaged pipeline which is submerged in a body of water. A need further exists for a method and apparatus to remotely recover a submerged pipeline to the water surface.

SUMMARY OF THE INVENTION

The present invention deals with these needs by utilizing a buoy in combination with cables controlled from the water surface to deploy equipment to a submerged pipeline. A pipe alignment frame is lowered by an alignment cable into an operational relationship with the submerged pipeline. The alignment cable, which has a first end and a second end, is connected by its first end to a buoy. The second end of the alignment cable can be controlled from the water surface to take in or pay out the alignment cable. Viewing the invention after the pipe alignment frame has been lowered into an operational relationship with the pipeline, the first end of the alignment cable is attached to an equipment means. The equipment means is disposed in a predetermined, functional relationship with the submerged pipeline. A retrieval cable having a first end and a second end is attached by its first end to the equipment means. The retrieval cable is used to recover the equipment means to the water surface.

To operate the invention from the water surface, the pipe alignment frame is lowered into an operational relationship with the submerged pipeline by paying out the alignment cable from its second end. Once the pipe alignment frame is located in an operational relationship with the submerged pipeline, the second end of the alignment cable is paid out until the buoy and attached first end of the alignment cable reach the water surface. An equipment means coupled to the first end of a retrieval cable is connected to the first end of the alignment cable. The second end of the alignment cable is then taken in as the second end of the retrieval cable is paid out to draw the equipment means toward the pipe alignment frame and into a predetermined location relative to the submerged pipeline. After the equipment means is operated it can be recovered to the water surface by taking in the second end of the retrieval cable while paying out the second end of the alignment cable.

In an alternative embodiment, a lift head means attached to a lift head can be deployed to the pipeline in a fashion similar to the deployment of the equipment means. The lift head means is drawn toward the pipeline until the lift head can be actuated into a gripping relationship with the pipeline. A retrieval cable connected to the lift head means can then be taken in from the lay barge to raise the pipeline to the water surface.

BRIEF DESCRIPTION OF THE DRAWINGS

In order that the features of this invention may be better understood, a detailed description of the invention as illustrated in the attached drawings follows.

DESCRIPTION OF THE PREFERRED EMBODIMENT

Figure 1:
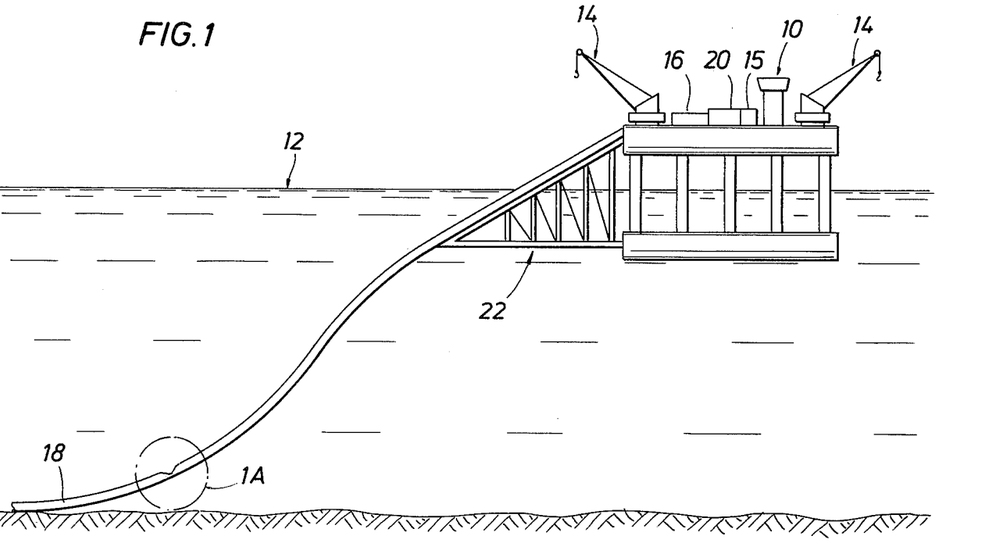
FIG. 1 is a diagrammatic view illustrating a pipeline buckle occurring as a pipeline is lowered from a lay barge.

Referring to FIG. 1, a semi-submersible vessel, or lay barge 10 used in pipeline construction is illustrated as floating in a body of water 12. The lay barge 10 utilizes derrick or similar crane means 14 and winch means 15 mounted on the lay barge 10 to perform heavy lifting operations. In the construction of pipeline 18, sections of pipe (not shown) on board the lay barge 10 are placed on a welding ramp 16 and are welded into continuous pipeline 18. Pipeline 18 is held in tension between the sea floor and the lay barge 10 by a pipeline tensioner 20 as pipeline 18 is laid. This procedure for tensioned pipeline construction is well known in the art and is thoroughly described in U.S. Pat. No. 3,331,212. As the lay barge 10 moves forward by its own propulsion or by winch and anchor means (not shown), the pipeline 18 is lowered from the lay barge 10 over a stinger 22. The stinger 22 is attached to and extends from the aft end of the lay barge 10. The stinger 22 reduces the possibility of pipeline buckling during construction because it limits the bending arc of pipeline 18 between lay barge 10 and the sea floor.

Figure 1A:
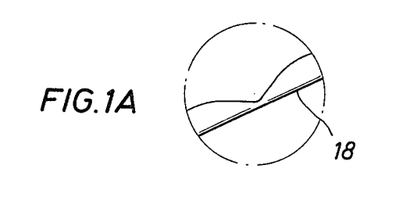
FIG. 1A illustrates a wet buckle in a pipeline.

The accidental loss of tension in the pipeline 18 can cause the pipeline 18 to buckle as it is being constructed. Such a "wet" buckle is illustrated in FIG 1A. The pipeline 18 can also be damaged following its construction by a ship's anchor, fishing operations, or geologic shifts in the sea floor. As a preliminary step in any repair operation, the location of the damage to the pipeline must be determined. This can be accomplished by techniques well-known in the art which may use optical, acoustic, or logging equipment (not shown) internally run through the pipeline 18. External inspection techniques utilizing a remotely controlled vehicle or other means can also be used. Once the damage is located, the lay barge 10 is preferably located over the damage to begin the task of repair operations.

Figure 2A:
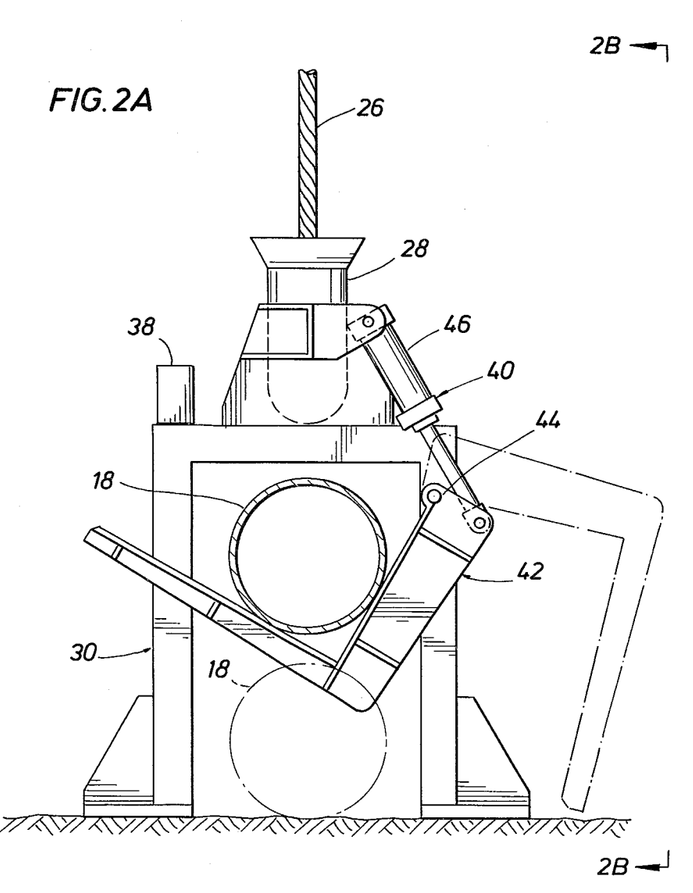
FIGS. 2A and 2B show elevation views of the pipe alignment frame in operational relationship with the submerged pipeline.
Figure 2B:
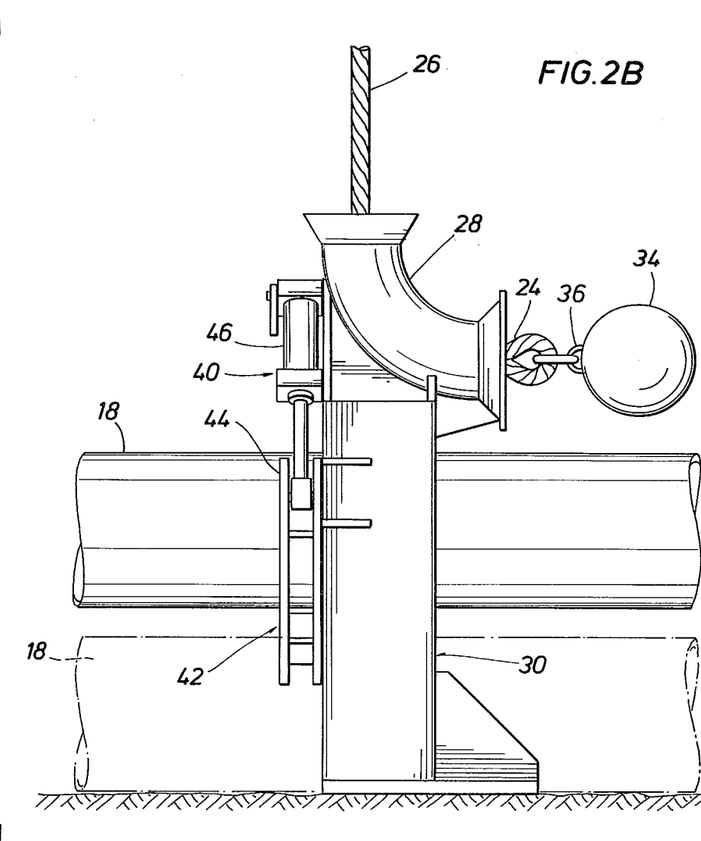

Referring to FIGS. 2A and 2B, a first end 24 of an alignment cable 26 is threaded through a cable alignment guide 28 attached to a pipe alignment frame 30. The second end 32 of the alignment cable 26 is attached to crane means 14 (See FIG. 1) which is able to "pay out" or "take in" the alignment cable 26. The cable alignment guide 28 as illustrated in FIG. 2B is preferably a hollow, arcuately shaped member and is flanged or belled at each end to reduce wear of the alignment cable 26 as it abrades against the bore of the cable alignment guide 28. The inner surface of the cable alignment guide 28 should be substantially smooth to prevent excessive friction and wear of the alignment cable 26 as it passes through the cable alignment guide 28. The cable alignment guide 28 may also be configured in any manner sufficient to facilitate travel of the alignment cable 26 therethrough.

Figure 3:
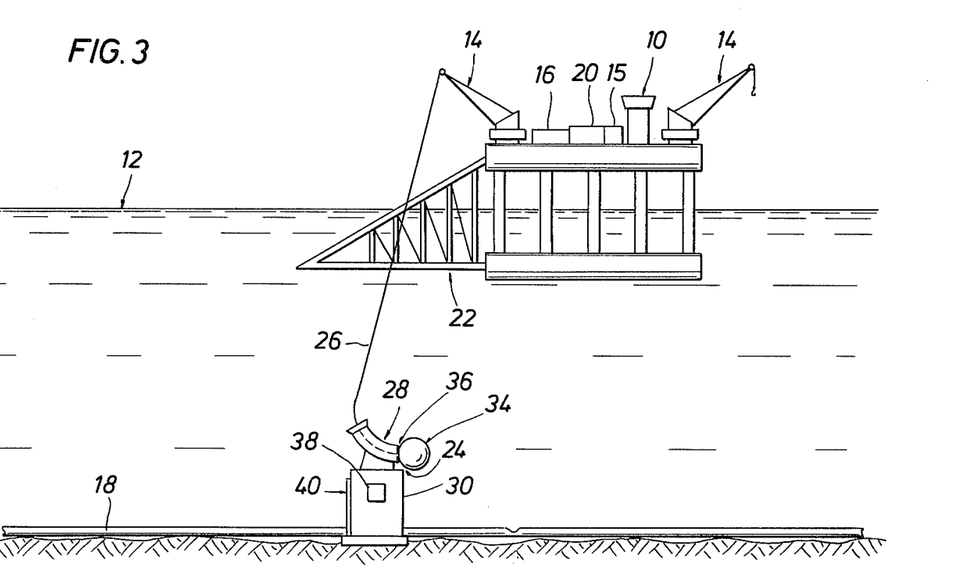
FIG. 3 is a diagrammatic view illustrating the pipe alignment frame being lowered from a lay barge to the submerged pipeline.

After the alignment cable 26 has been threaded through the cable alignment guide 28, a buoy 34 is attached by means of a connector means 36 to the first end 24 of the alignment cable 26. Once the buoy 34 has been attached to the alignment cable 26, the buoy 34, first end 24 of the alignment cable 26, and pipe alignment frame 30 is lowered into the water 12 by paying out the second end 32 of the alignment cable 26. Television cameras 38 or other positioning means attached to the pipe alignment frame 30 may be used to guide the lowering of the pipe alignment frame 30. The buoy 34 is preferably of a sufficient size or configuration to prevent the pipe alignment frame 30 from sliding off the alignment cable 26 as these elements are lowered. This configuration of the buoy 34, however, is not essential to the operability of the invention. The lowering of the pipe alignment frame 30 is preferably accomplished from the aft end of the lay barge 10, as illustrated in FIG. 3, for reasons which will later become apparent.

Figure 4:
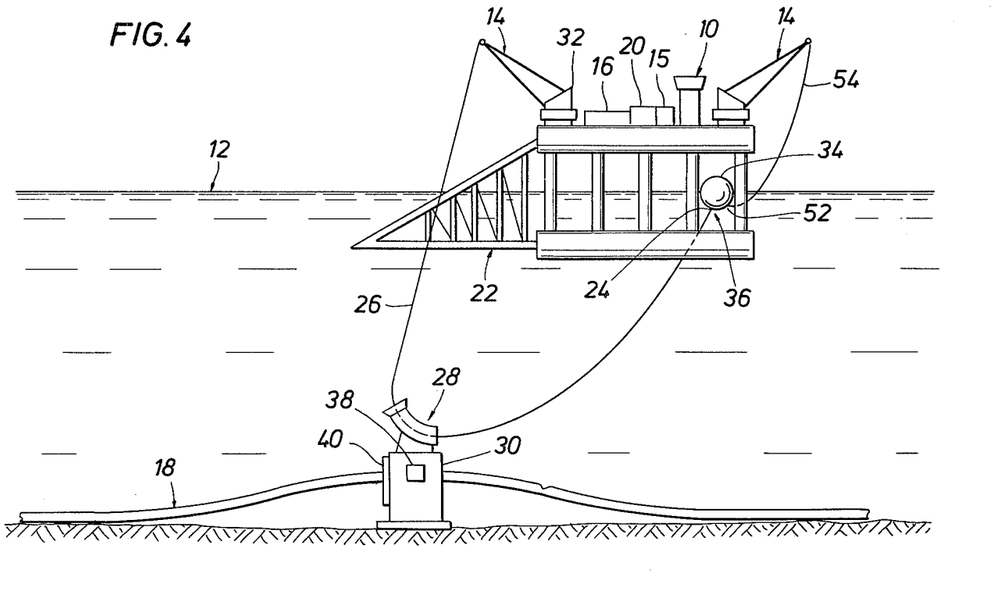
FIG. 4 is a diagrammatic view illustrating the recovery of the buoy after the alignment cable has been paid out.

Referring to FIG. 4, the pipe alignment frame 30 is illustrated as being lowered into an operational relationship with a substantially straight section of the pipeline 18. "Operational relationship" is defined herein as a fixed, predetermined orientation of the pipe alignment frame 30 with respect to the pipeline 18. Various mechanical means can be used to position the pipe alignment frame 30 into an operational relationship with the pipeline 18. The particular means used to achieve this operational relationship will vary according to the location of the pipeline 18, for the pipeline 18 may be suspended in the water, may lie exposed on the sea floor, or may be buried in a trench below the sea floor.

Presuming that the pipeline 18 is located on the sea floor, lifting means 40 can be used to raise the pipeline 18 into an operational relationship with the pipe alignment frame 30. Referring to FIGS. 2A and 2B, one such lifting means 40 is illustrated. The lifting means 40 has an L-shaped lifting arm 42 which pivots about a pin 44. The lifting arm 42 is actuated by a hydraulic cylinder means 46 which is powered by means of an umbilical cord (not shown). The umbilical cord is preferably controlled from the lay barge 10. Upon the engagement of the hydraulic cylinder means 46, the lifting arm 42 rotates about pin 44. This rotation causes the lifting arm 42 to grapple the pipeline 18 and raise it above the sea floor to a fixed elevation with respect to the pipe alignment frame 30. As the L-shaped lifting arm 42 lifts the pipeline 18, it forms an inverted V-shape which transversely positions the pipeline 18 with respect to the pipe alignment frame 30. This elevated and transverse alignment positions the pipeline 18 into an operational relationship with the pipe alignment frame 30.

Once the pipe alignment frame 30 is in an operational relationship with the pipeline 18, the operator continues to pay out the second end 32 of the alignment cable 26. This slackens the alignment cable and allows the buoy 34 to rise toward the water surface as is illustrated in FIG. 4. The buoy 34 must be sufficiently buoyant to lift to the water surface its own weight and the weight of a length of alignment cable 26 extending between the pipeline 18 and the water surface. As the buoy 34 rises, the attached alignment cable 26 slides through the cable alignment guide 28. The buoy 34 must be sufficiently buoyant to overcome any frictional forces encountered between the cable alignment guide 28 and the alignment cable 26 moving therethrough.

Once the buoy 34 and first end 24 of the alignment cable 26 have reached the water surface, the buoy 34 is recovered by a crane means 14, preferably from the fore end of the lay barge 10 as illustrated in FIG. 4. In a preferred embodiment, the first end 24 of the alignment cable 26 is connected by connector means 36 to an equipment or cutting guide 48. The equipment or cutting guide 48 is attached to an equipment or cutting means 50. As illustrated, a cutting means 50 and attached cutting guide 48 is connected by a connector means 36 to the first end 24 of the alignment cable 26. The cutting means 50 is also attached to the first end 52 of a retrieval cable 54. The retrieval cable 54 can be taken in from the lay barge 10 to recover the attached cutting means 50.

Figure 5A:
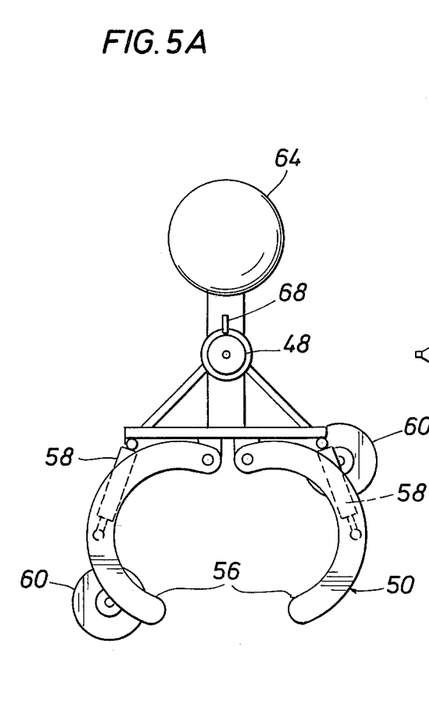
FIGS. 5A and 5B show elevation views of equipment means adapted for serving a submerged pipeline.
Figure 5B:
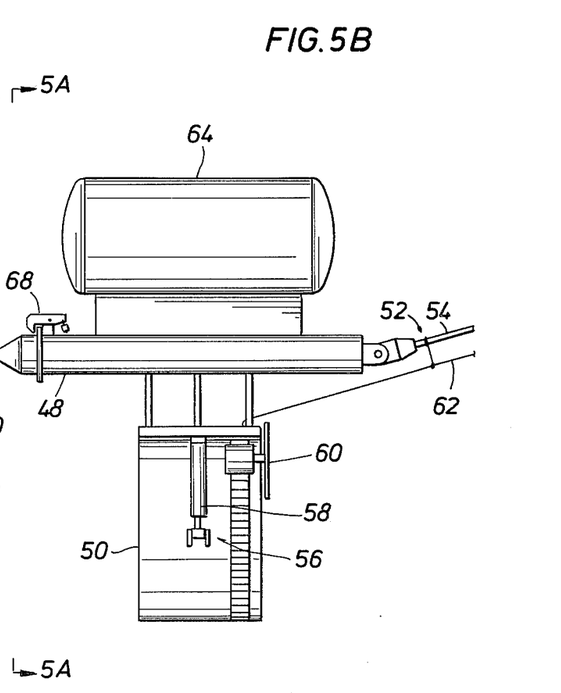

Referring to FIGS. 5A and 5B, a cutting means 50 for severing pipe is illustrated. Pipeline gripping clamps 56 actuated by hydraulic cylinder means 58 secure the cutting means 50 by gripping the pipeline. The cutting means 50 illustrated uses mechanical rotary cutters 60 to sever the submerged pipeline. Any means suitable for severing the pipeline 18 can be utilized, including, but not limited to mechanical cutters, explosive charges, or other means well-known in the art. For example, U.S. Pat. No. 4,140,890 discloses an underwater cutter for submerged pipelines which uses an electrode fed by $O_2$ or gaseous hydrogen fluoride to sever the pipeline 18. An umbilical cord 62 attached to the retrieval cable 54 is used to power the cutting means 50. A buoyancy tank 64 attached to the cutting means 50 reduces the net weight of the cutting means 50 that must be supported by the retrieval cable 54.

Figure 6:
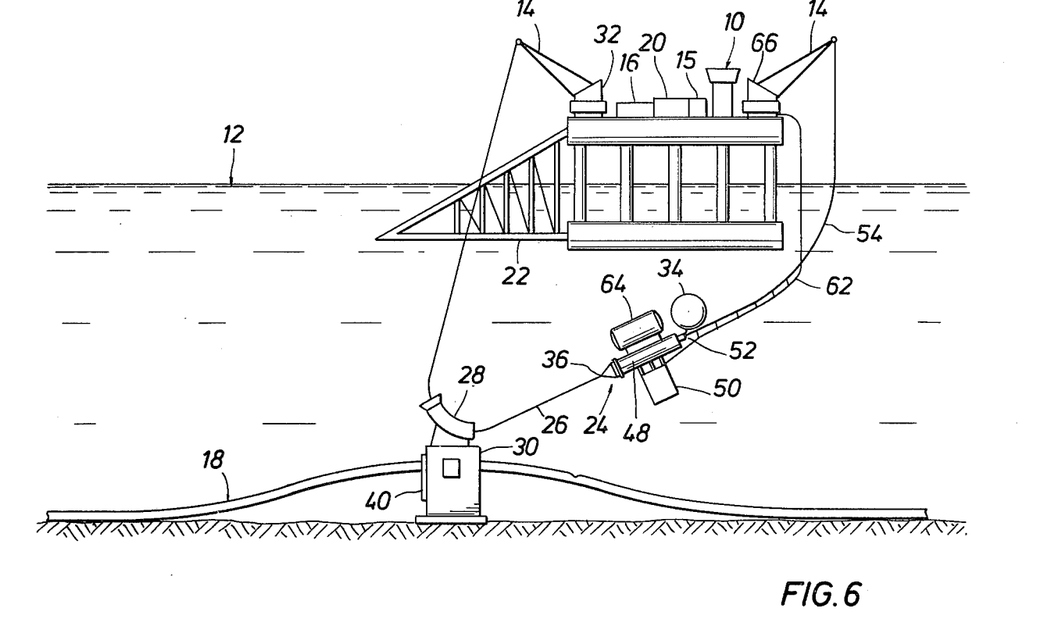
FIG. 6 is a diagrammatic view illustrating the deployment of the equipment means toward the pipe alignment frame.

The cutting means 50 is preferably deployed from the fore end of the lay barge 10. To lower the cutting means 50 to the submerged pipeline 18, the second end 32 of the alignment cable 26 is taken in while the second end 66 of the retrieval cable 54 is simultaneously paid out. This procedure draws the cutting means 50 toward pipe alignment frame 30 and pipeline 18 as illustrated in FIG. 6. As the cutting means 50 is lowered, its elevation relative to the sea floor can be controlled by taking in or paying out the retrieval cable 54. 8ecause the cutting means 50 is preferably deployed from the fore end of the lay barge 10 while the pipe alignment frame 30 was deployed from the aft end, the cutting means 50 must be moved laterally toward pipe alignment frame 30. This lateral movement occurs as the second end 32 of the alignment cable 26 is taken in.

Figure 7:
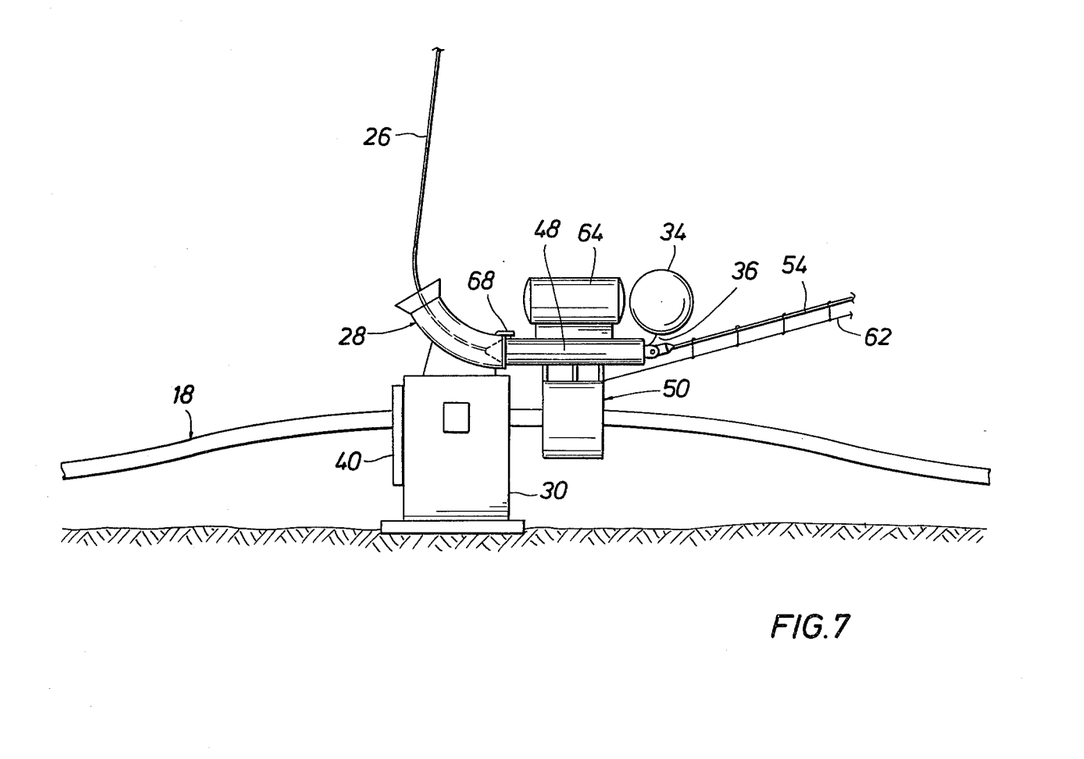
FIG. 7 is an elevation view illustrating the equipment means disposed in a predetermined location relative to the pipe alignment frame.

As the second end 32 of the alignment cable 26 continues to be taken in, the cutting guide 48 attached to the cutting means 50 is drawn toward the pipe alignment frame 30. To align the cutting means 50 as it is drawn toward the pipe alignment frame 30, the operator can view the operation by manevering the television camera 38 attached to the pipe alignment frame 30. The operator can then manipulate the retrieval cable 54 and alignment cable 26 from the lay barge 10 to draw the cutting means 50 into a predetermined location relative to the pipeline 18. This predetermined location, as illustrated in FIG. 7, can be maintained by keeping tension on the alignment cable 26. In the alternative, a detachable latch means 68 can secure the cutting guide 48 to the cable alignment guide 28. The cable alignment guide 28 and cutting guide 48 are configured such that the cutting means 50 at the predetermined location relative to pipeline 18 is in a position to sever the pipeline 18 at a predetermined distance from the pipe alignment frame 30.

Figure 8:
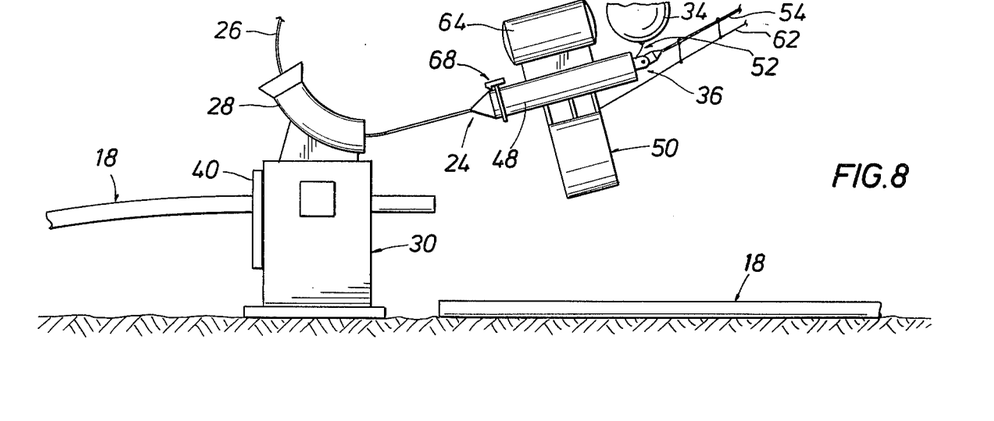
FIG. 8 is an elevation view illustrating the recovery of the equipment means after the pipeline has been severed.

Once the pipeline 18 has been severed, the cutting means 50 can be recovered remotely from the lay barge 10 by taking in the second end 66 of the retrieval cable 54 while paying out the second end 32 of the alignment cable 26. Referring to FIG. 8, the latch means 68 coupling the cutting guide 48 and cable alignment guide 28 is disengaged. The pipeline gripping clamps 56 are disconnected from the pipeline 18. The cutting means 50 is then recovered by taking in the second end 66 of the retrieval cable 54 while paying out the second end 32 of the alignment cable. Once the cutting means 50 reaches the water surface and has been lifted onto the lay barge 10, the cutting means 50 is detached from the alignment cable 26 and retrieval cable 54.

Figure 9A:
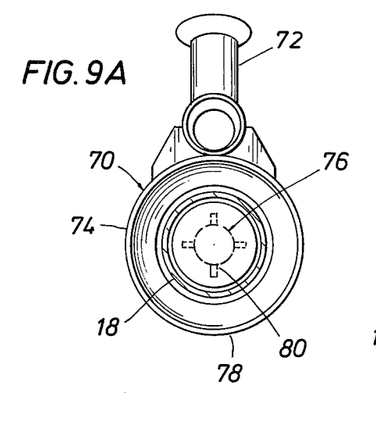
FIGS. 9A and 9B are elevational views of a lift head means.
Figure 9B:
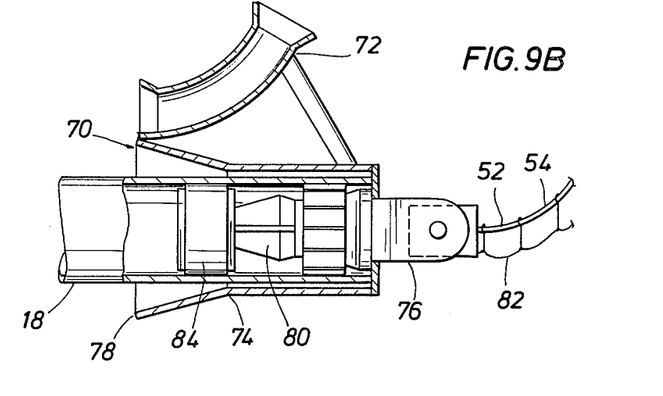

In an alternative embodiment, the end of submerged pipeline 18 is recovered by a lift head means 70 attached to retrieval cable 54 which is controlled from the lay barge 10. Referring to FIGS. 9A and 9B, a lift head means 70 is illustrated. The lift head means 70 comprises a cable alignment guide 72 attached to a stabbing guide 74. The cable alignment guide 72 can be fashioned in various orientations but is illustrated as being analogous in shape to the cable alignment guide 28 attached to the pipe alignment frame 30. The cable alignment guide 72 must be of sufficient inside diameter to allow the passage of the alignment cable 26 therethrough.

The stabbing guide 74 is disposed about and is connected to a lift head 76. As the lift head means 70 is drawn by the alignment cable 26 toward the pipe alignment frame 30, the stabbing guide 74 aligns the prepared pipeline end with the lift head means 70 such that the lift head 76 is in a gripping relationship with the pipeline 18. While the stabbing guide 74 is illustrated as being located concentrically about the lift head 76, the stabbing guide 74 can be configured in any manner sufficient to accomplish its intended function. As illustrated in the preferred embodiment, the inside dimension of the stabbing guide 74 must be sufficiently large to permit the insertion of the severed pipeline 18 end into the stabbing guide 74. The stabbing guide 74 is preferably flanged at its mating end 78 to facilitate alignment with and insertion of the severed pipeline 18 end therethrough.

Referring specifically to FIG. 9B, the construction and operation of lift head 76 is well-known in the art. For example, U.S. Pat. No. 3,842,612 discloses a lift head 76 which is typically used. The lift head 76 in the present invention is inserted into the prepared, open end of pipeline 18. Hydraulically activated bits or grip mechanisms 80 expand radially outward from the lift head 76 to engage the inside diameter of the pipeline 18. The weight of the pipeline 18 recoverable by this type of lift head 76 is limited only by the tearing and hoop bearing stress of the pipeline 18. Another type of lift head (not shown) uses a bar inserted through holes cut in the pipeline 18 to secure the pipeline 18 to the retrieval cable 54. Either type of lift head design can be installed in pipelines varying in size from twelve to forty-two inches in diameter. These types of lift heads 76 are capable of operating in depths beyond 2500 feet and can be installed with a minimum amount of preparatory work to the pipeline 18. The lift heads 76 have another advantage in that they do not interfere with the stinger 22 and pipeline tensioners 20 on the lay barge 10 as the retrieval cable 54 is taken in.

The lift head means 70 in the preferred embodiment 70 is deployed by a procedure similar to that of the cutting means 50. To connect the cutting means 50 to the alignment cable 26, the first end 24 of the alignment cable 26 is preferably threaded through the cable alignment guide 72 of the lift head means 70. The buoy 34 is reattached by connector means 36 to the first end 24 of the alignment cable 26. The first end 52 of the retrieval cable 54 can then be attached to any part of the lift head means 70 but is preferably connected to the lift head 76. 8ecause the lift head 74 in the preferred embodiment will axially grip the pipeline 18, the taking in of the retrieval cable 54 will exert an axial force on the pipeline 18. This axial force will reduce the possibility of damage to the pipeline 18 end created by bending moments as the pipeline 18 is raised to the water surface.

Figure 10:
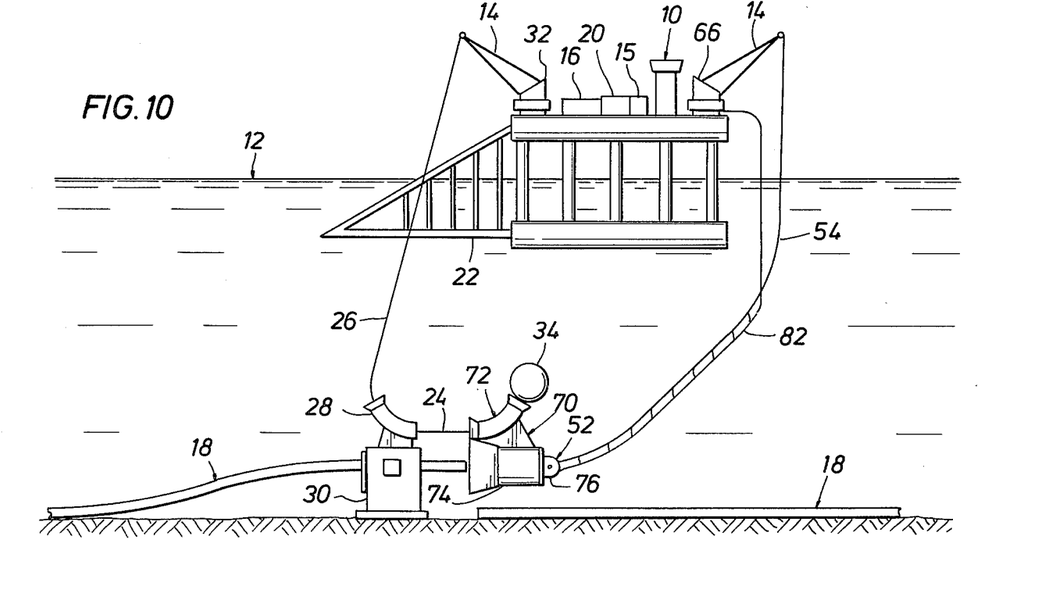
FIG. 10 is a diagrammatic view illustrating the deployment of the lift head means toward the severed end of the submerged pipeline.

Referring to FIG. 10, the lift head means 70 is lowered to the pipeline 18 by taking in the second end 32 of the alignment cable 26 while paying out the second end 66 of the retrieval cable 54. As the lift head means 70 is pulled toward the pipe alignment frame 30, the stabbing guide 74 aligns the lift head 76 with the severed end of the pipeline 18. Continued manipulation of the alignment cable 26 and retrieval cable 54 pulls the lift head 76 into a gripping relationship with the pipeline 18. The lift head 76 is then activated by the operator on the lay barge 10 to grip the pipeline 18 by means of an umbilical cord 82 attached to the lift head 76. The umbilical cord 82 is preferably attached to the retrieval cable 54 to prevent fouling of either cable with the other.

Before the end of pipeline 18 is raised to the water surface the pipeline 18 is preferably voided of any fluids by a pipeline pig 84 to reduce the weight of the pipeline 18 as the end of pipeline 18 is raised to the water surface. This reduction in weight will limit the possibility of pipeline 18 buckling as has been previously described. Various pigging operations to void the pipeline 18 are well-known in the art. For example, a pipeline pig 84 can be pumped by pressurized gas from the shore or an offshore platform (not shown) toward a severed end of the pipeline. As the pig 84 travels toward the pipeline's severed end it voids the entire pipeline 18 of fluids. Alternative pigging operations have been developed to repair damage to a pipeline 18 at some distance from the shore or an offshore platform. In a procedure thoroughly described in U.S. Pat. No. 3,788,084, a pipeline pig 84 can be inserted into the severed end of pipeline 18 and displaced a sufficient distance toward the shore or the offshore platform to void only the portion of pipeline 18 being raised to the water surface. This procedure alleviates the need for voiding the entire pipeline 18 of fluids and reduces the amount of fluid inside pipeline 18 which is discharged into the water. Lift heads 76 adapted to this operation must completely seal the severed end of pipeline 18 from leakage of the water into the voided pipeline portion.

Referring to FIG. 9B, a pipeline pig 84 is illustrated as being attached to the lift head 76. The pipeline pig 84 is preferably pumped through the pipeline 18 using the techniques previously described. Once a sufficient portion of the pipeline 18 has been voided, the gripping connection is verified between the lift head 76 and pipeline 18 by slackening the alignment cable 26 and by tensioning the retrieval cable 54. Once an adequate gripping connection has been verified, the alignment cable 26 is preferably retrieved to prevent its fouling as the pipeline 18 is recovered.

Figure 11:
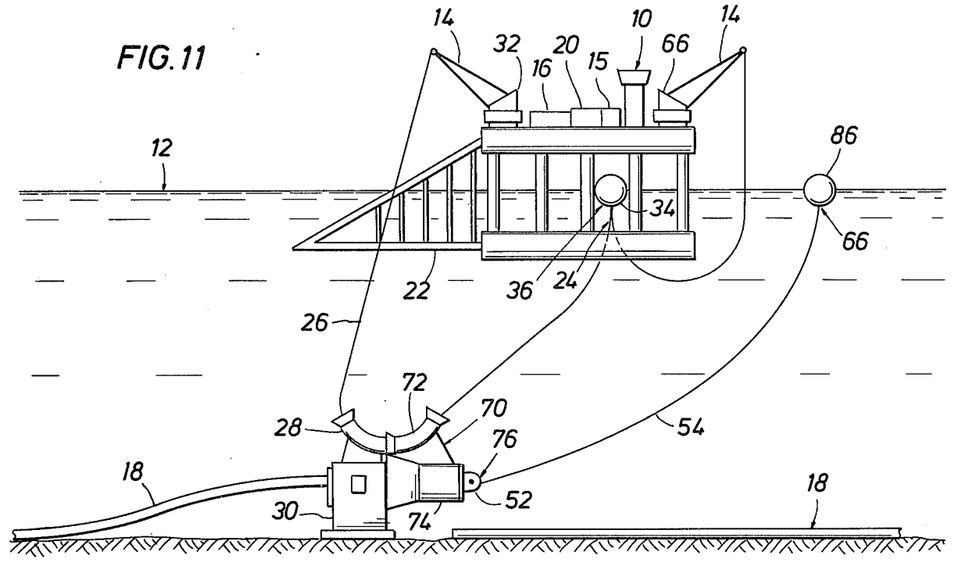
FIG. 11 is an diagrammatic view illustrating the lift head means in gripping relationship with the pipeline and the subsequent recovery of the buoy and alignment cable.

The alignment cable 26 can be retrieved by using one of several alternative techniques. Referring to FIG. 11, the second end 32 of the alignment cable 26 can be paid out until the buoy 34 reaches the water surface. The buoy 34 can be detached and the second end 32 of the alignment cable 26 taken in through both cable alignment guides 28 and 72 to the lay barge 10. The alignment cable 26 can alternatively be retrieved by raising the buoy 34 to the water surface, removing the buoy 34, and then taking in the first end 24 of the alignment cable 26 while releasing its second end 32.

Figure 12:
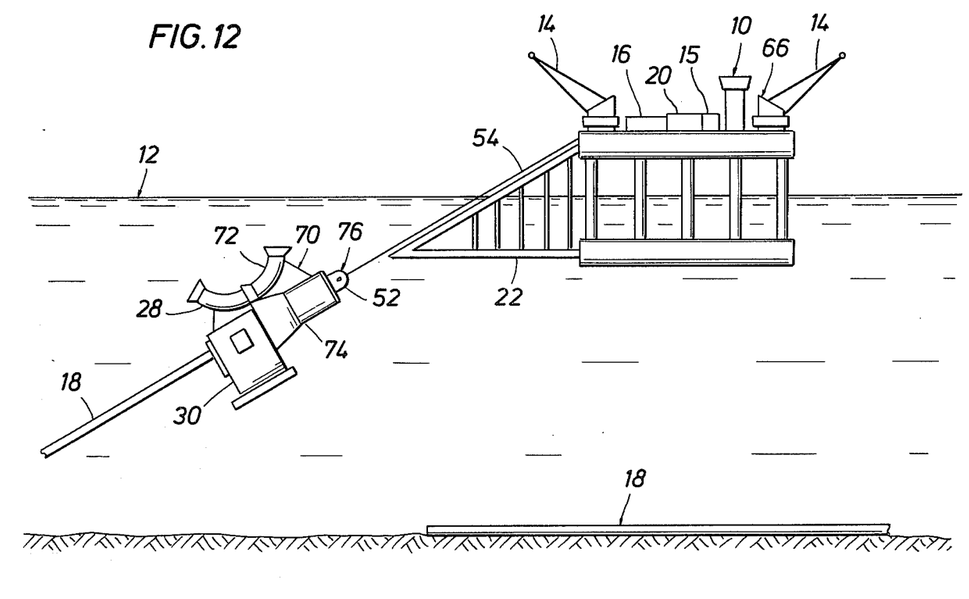
FIG. 12 is an diagrammatic view illustrating the recovery of the retrieval cable and subsequent raising of the pipeline toward the water surface.

Following the retrieval of the alignment cable 26, the pipeline 18 is raised to the water surface. To raise the pipeline 18, a float 86 is connected to the second end 66 of the retrieval cable 54 as is indicated in FIG. 11. The lay barge 10 then moves forward until the float 86 can be recovered, preferably from the aft end of the lay barge 10. The float 86 is disconnected and the second end 66 of the retrival cable 54 is attached to a winch means 15. The winch means 15 is preferably located between the pipeline tensioner 20 and the fore end of the lay barge 10 such that the pipeline 18 can be winched through the pipeline tensioner 20. Referring to FIG. 12, the second end 66 of the retrieval cable 54 is taken in by the winch means 15 until the pipeline 18 is raised to the surface of the water. The pipe alignment frame 30 is disconnected from the pipeline 18 and from the lift head means 70 and is lifted onto the lay barge 10. Divers (not shown) can be used to disconnect the pipe alignment frame 30 from the pipeline 18 if necessary. Alternatively, the pipe alignment frame 30 can be remotely disconnected and raised to the lay barge 10 before the pipeline 18 is recovered from the sea floor. After the pipeline 18 has been raised to the water surface and the pipe alignment frame 30 is removed, the pipeline 18 is further raised by taking in the retrieval cable 54 until the pipeline 18 is supported by the stinger 22. Preferably, the retrieval cable 54 is taken in until pipeline 18 is gripped by the pipeline tensioner 20. The lift head means 70 is then disconnected from the pipeline 18 and normal pipelaying operations are resumed.

The apparatus of the present invention and the best mode contemplated for practicing the invention have been described. The invention provides a novel and useful method and apparatus for remotely deploying equipment to a submerged pipeline. The invention also provides a novel and useful method and apparatus for remotely recovering a submerged pipeline. It should be understood that the invention should not be unduly limited to the foregoing set forth for illustrative purposes. Various modifications and alterations of the invention will be apparent to those skilled in the art without departing from the true scope of th invention.

What is claimed is:

1. A method for remotely deploying an equipment means from the water surface to a submerged pipeline, comprising the steps of:

lowering a pipe alignment frame into an operational relationship with a substantially straight segment of said pipeline by paying out an alignment cable threadingly engaged with said pipe alignment frame, said alignment cable having a first end connected to a buoy, said alignment cable also having a second end controlled from the water surface to pay out and take in said alignment cable;

paying out said second end of the alignment cable, after said pipe alignment frame is in an operational relationship with said pipeline, to enable said buoy to raise said first end of the alignment cable to the water surface;

coupling said first end of the alignment cable to said equipment means, said equipment means having a first end of a retrieval cable connected thereto, said retrieval cable also having a second end controlled from the water surface to pay out and take in said retrieval cable;

taking in said alignment cable while paying out said retrieval cable to lower said equipment means towards said pipe alignment frame and into a predetermined location relative to said pipeline; and taking in said retrieval cable while paying out said alignment cable to raise said equipment means towards the water surface.

2. A method for remotely deploying an equipment means to a submerged pipeline as recited in claim 1, further comprising the step of raising the pipeline above the sea floor by a lifting means attached to said pipe alignment frame.

3. An apparatus for remotely deploying an equipment means from the water surface to a submerged pipeline, comprising:

a pipe alignment frame in an operational relationship with a substantially straight segment of said pipeline;

an alignment cable threadingly engaged with said pipe alignment frame, said alignment cable having a first end and a second end;

a buoy connected to said first end of the alignment cable, said buoy being sufficiently buoyant to raise said first end of the alignment cable to the water surface as said alignment cable is paid out;

an equipment means coupled to said first end of the alignment cable and being in a predetermined location relative to said pipeline; and a retrieval cable having a first end connected to said equipment and having a second end controlled from the water surface to take in and pay out said retrieval cable.

4. An apparatus as recited in claim 3, wherein a positioning means is attached to said pipe alignment frame to facilitate the lowering of said pipe alignment frame into the operational relationship with said pipeline.

5. A method for remotely severing a submerged pipeline, comprising the steps of:
  lowering a pipe alignment frame into an operational relationship with a substantially straight segment of said pipeline by paying out an alignment cable threadingly engaged with said pipe alignment frame, said alignment cable having a first end connected to a buoy, said alignment cable also having a second end controlled from the water surface to pay out and take in said alignment cable;
  paying out said second end of the alignment cable, after said pipe alignment frame is in an operational relationship with said pipeline, to enable said buoy to raise said first end of the alignment cable to the water surface;
  coupling said first end of the alignment cable to a cutting means, said cutting means having a first end of a retrieval cable connected thereto, said retrieval cable also having a second end controlled from the water surface to pay out and take in said retrieval cable;
  taking in said alignment cable while paying out said control cable to lower said cutting means towards said pipe alignment frame and into a predetermined location relative to said pipeline;
  severing said pipeline at a predetermined distance from said pipe alignment frame by means of said cutting means; and
  taking in said retrieval cable while paying out said alignment cable to raise said cutting means to the water surface.

6. A method for remotely severing a submerged pipeline as recited in claim 5, further comprising the step of raising said pipeline above the sea floor by a lifting means attached to said pipe alignment frame.

7. An apparatus for remotely severing a submerged pipeline, comprising:
  a pipe alignment frame in an operational relationship with a substantially straight segment of said pipeline;
  an alignment cable threadingly engaged with said pipe alignment frame, said alignment cable having a first end and a second end;
  a buoy connected to said first end of the alignment cable, said buoy being sufficiently buoyant to raise said first end of the alignment cable to the water surface as said alignment cable is paid out;
  a cutting means coupled to said first end of the alignment cable and being at a predetermined location relative to said pipeline; and
  a retrieval cable having a first end connected to said equipment and having a second end controlled from the water surface to take in and pay out said retrieval cable.

8. An apparatus as recited in claim 7, wherein a positioning means is attached to said pipe alignment frame to facilitate the lowering of said pipe alignment frame into the operational relationship with said pipeline.

9. A method for recovering a submerged pipeline, comprising the steps of:
  lowering a pipe alignment frame into an operational relationship with a substantially straight segment of said pipeline by paying out an alignment cable threadingly engaged with said pipe alignment frame, said alignment cable having a first end connected to a buoy, said alignment cable also having a second end controlled from the water surface to pay out and take in said alignment cable;
  paying out said second end of the alignment cable, after said pipe alignment frame is in an operational relationship with said pipeline, to enable said buoy to raise said first end of the alignment cable to the water surface;
  coupling said first end of the alignment cable to a lift head means, said lift head means having a lift head connected thereto for gripping a pipeline end upon the remote activation of said lift head, said lift head means having a first end of a retrieval cable connected thereto, said retrieval cable also having a second end controlled from the water surface to pay out and take in said retrieval cable;
  taking in said alignment cable while paying out said retrieval cable to lower said lift head means towards said pipe alignment frame until said lift head is in a position to grip said pipeline upon the activation of said lift head;
  gripping said pipeline by remotely activating said lift head until said lift head is in a gripping relationship with said pipeline; and
  taking in said retrieval cable while paying out said alignment cable to raise said lift head means and said pipeline towards the water surface.

10. A method for recovering a submerged pipeline as recited in claim 9, further comprising the step of disengaging said pipe alignment frame from said pipeline.

11. A method for recovering a submerged pipeline as recited in claim 9, further comprising the step of raising said pipeline above the sea floor by a lifting means attached to said pipe alignment frame.

12. A method for recovering a submerged pipeline as recited in claim 9, further comprising the step of dewatering the portion of said pipeline elevated above the sea floor as said pipeline is raised to the water surface.

13. An apparatus for recovering a submerged pipeline, comprising:
  a pipe alignment frame in an operational relationship with a substantially straight segment of said pipeline;
  an alignment cable threadingly engaged with said pipe alignment frame, said alignment cable having a first end and a second end;
  a buoy connected to said first end of the alignment cable, said buoy being sufficiently buoyant to raise said first end of the alignment cable to the water surface as said alignment cable is paid out;
  a lift head means coupled to said first end of the alignment cable;
  a lift head attached to said lift head means and in a gripping relationship with said pipeline; and
  a retrieval cable having a first end connected to said lift head means and having a second end controlled from the water surface to take in and pay out said retrieval cable.

14. An apparatus for recovering a submerged pipeline as recited in claim 13, further comprising a lifting means attached to said pipe alignment frame for raising said pipeline above the sea floor.

15. An apparatus for recovering a submerged pipeline as recited in claim 13, further comprising a dewatering means for voiding the portion of said pipeline elevated above the sea floor as said pipeline is raised to the water surface.

16. An apparatus for recovering a submerged pipeline, comprising:

a pipe alignment frame in an operational relationship with a substantially straight segment of said pipeline;

an alignment cable threadingly engaged with said pipe alignment frame, said alignment cable having a first end and a second end;

a buoy connected to said first end of the alignment cable, said buoy being sufficiently buoyant to raise said first end of the alignment cable to the water surface as said alignment cable is paid out;

a lift head means coupled to said first end of the alignment cable;

a lift head attached to said lift head means and in a gripping relationship with said pipeline;

a stabbing guide mounted to said lift head means at a predetermined position relative to said lift head such that as said alignment cable pulls said stabbing guide toward said pipe alignment frame, said stabbing guide aligns said lift head into a position to grip said pipeline upon the activation of said lift head; and a retrieval cable having a first end connected to said lift head means and having a second end controlled from the water surface to take in and pay out said retrieval cable.

17. An apparatus for recovering a submerged pipeline as recited in claim 16, further comprising a positioning means attached to said pipe alignment frame to facilitate the lowering of said pipe alignment frame into the operational relationship with said pipeline.

18. An apparatus for recovering a submerged pipeline as recited in claim 16, further comprising a lifting means attached to said pipe alignment frame for raising said pipeline above the sea floor.

19. An apparatus for recovering a submerged pipeline as recited in claim 16, further comprising a dewatering means for voiding the portion of said pipeline elevated above the sea floor as said pipeline is raised to the water surface.

20. A method for severing and recovering a submerged pipeline, comprising:

lowering a pipe alignment frame into an operational relationship with a substantially straight segment of said pipeline by paying out an alignment cable threadingly engaged with said pipe alignment frame, said alignment cable having a first end connected to a buoy, said alignment cable also having a second end controlled from the water surface to pay out and take in said alignment cable;

paying out said second end of the alignment cable, after said pipe alignment frame is in an operational relationship with said pipeline, to enable said buoy to raise said first end of the alignment cable to the water surface;

coupling said first end of the alignment cable to a cutting means, said cutting means having a first end of a retrieval cable connected thereto, said retrieval cable also having a second end controlled from the water surface to pay out and take in said retrieval cable;

taking in said alignment cable while paying out said control cable to lower said cutting means towards said pipe alignment frame and into a predetermined location relative to said pipeline;

severing said pipeline at a predetermined distance from said pipe alignment frame by means of said cutting means;

taking in said retrieval cable while paying out said alignment cable to raise said cutting means to the water surface;

disconnecting said cutting means from said first end of the alignment cable;

coupling said first end of the alignment cable to a lift head means, said lift head means having a lift head connected thereto for gripping a pipeline end upon the remote activation of said lift head, said lift head means having a first end of a retrieval cable connected thereto, said retrieval cable also having a second end controlled from the water surface to pay out and take in said retrieval cable;

taking in said alignment cable while paying out said retrieval cable to lower said lift head means towards said pipe alignment frame until said lift head is in a position to grip said pipeline upon the activation of said lift head;

gripping said pipeline by remotely activating said lift head until said lift head is in a gripping relationship with said pipeline; and taking in said retrieval cable while paying out said alignment cable to raise said lift head means and said pipeline towards the water surface.

21. A method for severing and recovering a submerged pipeline as recited in claim 20, further comprising the step of raising said pipeline above the sea floor by a lifting means attached to said pipe alignment frame.

22. A method for severing and recovering a submerged pipeline as recited in claim 20, further comprising the step of dewatering the portion of said pipeline elevated above the sea floor as said pipeline is raised to the water surface.

23. A method for severing and recovering a submerged pipeline as recited in claim 20, further comprising the step of disengaging said pipe alignment frame from said pipeline.

24. A method for severing and recovering a submerged pipeline as recited in claim 20, further comprising the step of raising said pipeline until said pipeline is gripped by a pipeline tensioner means located at the water surface.

* * * * *